United States Patent
Cho et al.

(10) Patent No.: US 9,925,973 B2
(45) Date of Patent: Mar. 27, 2018

(54) CONTROL METHOD AND SYSTEM FOR PREVENTING MOTOR FROM OVERHEATING WHEN TMED HYBRID VEHICLE IS DRIVEN

(71) Applicant: Hyundai Motor Company, Seoul (KR)

(72) Inventors: Teh Hwan Cho, Gyeonggi-Do (KR); Jong Bum Oh, Gyeonggi-Do (KR); Dong Yeon Han, Gyeonggi-Do (KR); Seong Ik Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 87 days.

(21) Appl. No.: 14/827,812

(22) Filed: Aug. 17, 2015

(65) Prior Publication Data
US 2016/0121876 A1 May 5, 2016

(30) Foreign Application Priority Data
Nov. 4, 2014 (KR) .......................... 10-2014-0152243

(51) Int. Cl.
*B60W 20/15* (2016.01)
*B60W 10/06* (2006.01)
(Continued)

(52) U.S. Cl.
CPC .......... *B60W 20/15* (2016.01); *B60L 3/0061* (2013.01); *B60L 7/10* (2013.01); *B60L 15/20* (2013.01);
(Continued)

(58) Field of Classification Search
CPC ....... E02F 9/123; E02F 9/2095; E02F 9/2091; E02F 9/2075; E02F 9/20; E02F 9/08;
(Continued)

(56) References Cited

U.S. PATENT DOCUMENTS

| 2005/0120715 A1* | 6/2005 | Labrador | ................ F01K 27/00 60/618 |
| 2005/0139363 A1* | 6/2005 | Thomas | ................ A62C 3/025 169/30 |

(Continued)

FOREIGN PATENT DOCUMENTS

| EP | 2703242 A1 | 3/2014 |
| JP | 2006-094626 A | 4/2006 |

(Continued)

*Primary Examiner* — Behrang Badii
(74) *Attorney, Agent, or Firm* — Mintz Levin Cohn Ferris Glovsky and Popeo, P.C.; Peter F. Corless

(57) ABSTRACT

A control method and system are provided for preventing a motor from overheating when a TMED hybrid vehicle is driven to thus improve driving performance by operating an engine before limiting motor output based on a driving state while the vehicle is driven in an EV mode, and the current temperature of the motor. The method includes monitoring a motor temperature of a hybrid vehicle and operating an engine when the current motor temperature of the motor is a first motor temperature or greater when the vehicle is driven in an EV mode. In addition, motor output is limited when the current motor temperature is equal to or greater than a third motor temperature, which is greater than the first motor temperature, after the engine is operated.

8 Claims, 4 Drawing Sheets

(51) Int. Cl.
*B60W 10/08* (2006.01)
*B60L 3/00* (2006.01)
*B60L 7/10* (2006.01)
*B60L 15/20* (2006.01)
*B60W 30/184* (2012.01)

(52) U.S. Cl.
CPC ......... *B60L 15/2054* (2013.01); *B60W 10/06* (2013.01); *B60W 10/08* (2013.01); *B60W 30/1843* (2013.01); *B60L 2240/36* (2013.01); *B60L 2240/423* (2013.01); *B60L 2240/425* (2013.01); *B60L 2240/443* (2013.01); *B60L 2240/485* (2013.01); *B60L 2240/507* (2013.01); *B60L 2240/662* (2013.01); *B60L 2260/26* (2013.01); *B60W 2510/087* (2013.01); *B60W 2710/06* (2013.01); *B60W 2710/08* (2013.01); *Y02T 10/645* (2013.01); *Y02T 10/72* (2013.01); *Y02T 10/7275* (2013.01); *Y02T 10/7291* (2013.01); *Y02T 90/16* (2013.01); *Y10S 903/93* (2013.01)

(58) Field of Classification Search
CPC .. B60W 20/00; B60W 30/1882; B60W 10/02; B60W 20/13; B60W 10/04; B60W 20/15; B60W 10/06; B60W 10/08; B60W 30/186; B60W 20/40; B60W 20/10; B60L 11/1851; B60L 11/1872; B60L 11/18; B60L 11/12; B60L 11/14; B60L 15/20; H01M 10/48; B60K 6/48; B60K 6/485; B60K 6/28; F02D 28/00; F16H 59/00; H02J 7/00; H05K 7/20927; H05K 7/20; G06F 17/00

See application file for complete search history.

(56) References Cited

U.S. PATENT DOCUMENTS

| | | |
|---|---|---|
| 2009/0115491 A1 | 5/2009 | Anwar et al. |
| 2009/0143189 A1* | 6/2009 | Hasegawa ............... B60K 6/48 477/5 |
| 2009/0211826 A1 | 8/2009 | Hashimoto |
| 2012/0056470 A1 | 3/2012 | Kim |
| 2012/0204539 A1* | 8/2012 | Gonze ..................... B60K 6/48 60/274 |
| 2012/0216983 A1* | 8/2012 | Bennion ............ B60H 1/00907 165/41 |
| 2013/0296112 A1 | 11/2013 | Yamazaki et al. |
| 2014/0316624 A1* | 10/2014 | Aoki ..................... B60W 10/30 701/22 |
| 2015/0032314 A1* | 1/2015 | Kitamura ................ E02F 9/123 701/22 |
| 2015/0134166 A1* | 5/2015 | Aoki ..................... B60K 6/445 701/22 |

FOREIGN PATENT DOCUMENTS

| | | |
|---|---|---|
| JP | 2006-335216 A | 12/2006 |
| JP | 2007-244072 A | 9/2007 |
| JP | 4380605 B2 | 12/2009 |
| JP | 2010-213461 A | 9/2010 |
| JP | 2011-084170 A | 4/2011 |
| JP | 5214573 B2 | 6/2013 |
| KR | 10-2009-0101015 | 9/2009 |

\* cited by examiner

- RELATED ART -

- PRESENT INVENTION -

CONTROL METHOD AND SYSTEM FOR PREVENTING MOTOR FROM OVERHEATING WHEN TMED HYBRID VEHICLE IS DRIVEN

CROSS-REFERENCE TO RELATED APPLICATION

This application claims under 35 U.S.C. § 119(a) the benefit of Korean Patent Application No. 10-2014-0152243 filed Nov. 4, 2014, the entire contents of which are incorporated herein by reference.

BACKGROUND (a) Technical Field

The present disclosure relates to a control method and system for preventing a motor from overheating when a transmission mounted electric device (TMED) hybrid vehicle is driven. More particularly, it relates to a control method and system for preventing performance from deteriorating due to a motor overheating when a TMED hybrid vehicle is driven in an electric vehicle (EV) mode.

(b) Background Art

A hybrid vehicle is an environmentally-friendly vehicle that uses an engine and an electric motor as power sources. In general, the hybrid vehicle is driven by the electric motor using battery power until the vehicle reaches a predetermined speed after the vehicle starts, and driven by properly combining motor power and engine power based on a driver intention and a battery state.

A transmission mounted electric device (TMED) hybrid vehicle is a hybrid vehicle that adopts a TMED, and the electric motor is mounted within the TMED hybrid vehicle to be attached to a transmission. In other words, the electric motor is disposed between an engine clutch and the transmission. The TMED hybrid vehicle is also driven by the electric motor using battery power until the vehicle reaches a predetermined speed after the vehicle starts, and a driving mode of the TMED hybrid vehicle is classified into a hybrid elective vehicle (HEV) mode in which both the engine and the electric motor are driven, and an EV mode in which the electric motor is driven.

Meanwhile, a TMED HEV and a plug-in hybrid electric vehicle (PHEV) in the related art are driven in the EV mode by utilizing electrical energy accumulated in the battery to be controlled with optimum fuel efficiency when a sufficient amount of electricity remains in the battery. In addition, the vehicle performs regenerative braking by utilizing a motor having a high capacity under a driving condition in which driving power is not separately required, thereby achieving improved fuel efficiency compared to the existing general vehicle by the hybrid operation.

However, when the vehicles are driven at substantially high speeds or with substantially high output by the electric motor, an amount of heat emitted from the motor increases, and when a temperature of the motor increases to a predetermined level or greater, the engine is operated regardless of the driver intention, or limitations may exist in maintaining driving performance due to limited output caused by the overheating of the motor.

In other words, when the motor is overheated at a predetermined level or greater when the TMED hybrid vehicle in the related art is driven in the EV mode at substantially high speeds or with substantially high load, an operation of limiting motor power is performed to protect a motor system, output of the motor is limited, and as a result, the engine compensates for insufficient power.

However, when the engine is suddenly operated regardless of the driver's intention due to deterioration in output of the motor, it may not be possible to achieve driving power required by the driver until driving power from the engine is sufficiently transmitted to the wheels, and as a result, there is a limitation in allowing the engine to be operated in a linear manner. Further, the vehicle may not be driven with maximum output due to a limitation of motor output, that is, until the motor is cooled to a predetermined level or greater.

In particular, for the PHEV, an amount of heat emitted from the motor is further increased when the vehicle is driven in the EV mode with a high load utilizing the motor and the battery having a high capacity compared to the existing HEV, and as a result, an alternative for solving the overheating problem of the motor when the vehicle is driven is considered relevant to improving the driving system.

The above information disclosed in this section is merely for enhancement of understanding the background of the invention and therefore it may contain information that does not form the prior art that is already known in this country to a person of ordinary skill in the art.

SUMMARY

The present invention has been made provides a control method for preventing a motor from overheating when a TMED hybrid vehicle is driven, capable of preventing the motor from overheating and improving driving performance by operating an engine before limiting motor output in consideration of a driving state when the TMED hybrid vehicle is driven in an EV mode, and the current temperature of the motor.

In one aspect, the present invention provides a control method for preventing a motor from overheating when a TMED hybrid vehicle is driven, the method may include: monitoring a motor temperature of a hybrid vehicle; operating an engine when the current motor temperature of the motor is a first motor temperature or greater when the vehicle is driven in an EV mode; and limiting motor output when the current motor temperature is equal to or greater than a third motor temperature, which is greater than the first motor temperature, after the engine is operated. In addition, the limiting of the motor output may include determining a final motor output using the current motor temperature, which has reached the third motor temperature, as an output limitation factor, and limiting the motor output to the determined final motor output or less.

Further, the motor output may be limited when the current motor temperature of the motor is equal to or greater than a second motor temperature, which is greater than the first motor temperature and lower than the third motor temperature, at the time of performing regenerative braking, a final motor output may be determined using the current motor temperature, which has reached the second motor temperature, as an output limitation factor, and the motor output may be limited to the determined final motor output or less. When an outside temperature of the vehicle is a predetermined temperature or greater or when a transmission oil temperature is a reference temperature or greater, a motor temperature value, corrected using the outside temperature and the transmission oil temperature as temperature correction factors, may be used as the current motor temperature.

According to the control method for preventing a motor from overheating when the TMED hybrid vehicle is driven according to the present invention, the engine may be operated before the motor output is limited as the motor is overheated when a temperature of the motor increases while the vehicle is driven, such that the motor output may be gradually reduced, thereby preventing a motor from overheating, ensuring a linear braking characteristic, and improving starting and accelerating performance.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
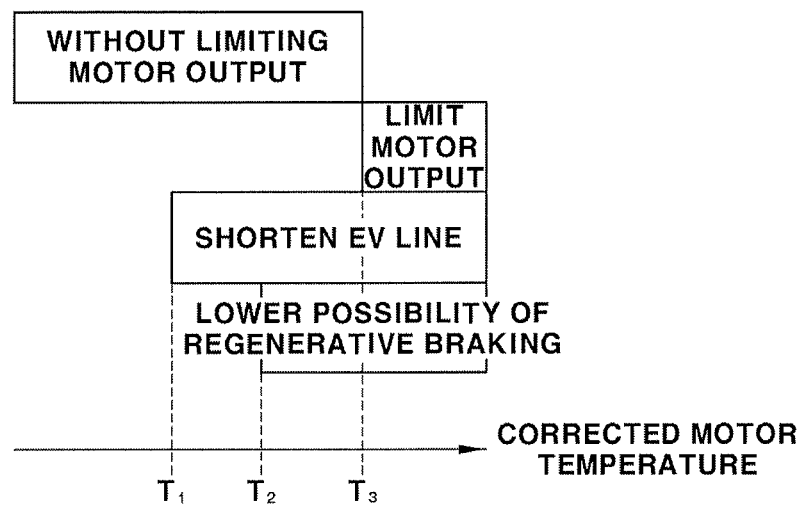
FIG. 1 is an exemplary view illustrating a control method for preventing a motor from overheating when a TMED hybrid vehicle is driven according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described so that those skilled in the technical field to which the present invention pertains may easily carry out the present invention. Notably, the method described hereinbelow may be executed by a processor having a processor and a memory.

Referring to FIG. 1, in the present invention, when a temperature of a motor is increased when a TMED hybrid vehicle is driven in an EV mode, an engine may be operated before a temperature of the motor reaches a temperature at which output of the motor requires limitation, and motor output is gradually decreased, thereby preventing a motor from overheating, ensuring a linear braking characteristic, and improving starting and accelerating performance. A limitation of motor output (e.g., drive torque) due to discharge of a battery and a limitation of motor output (e.g., charge torque) for charging the battery are distinguished, and a possibility of regenerative braking may be reduced, thereby preventing a motor from overheating even during regenerative braking.

Figure 2:
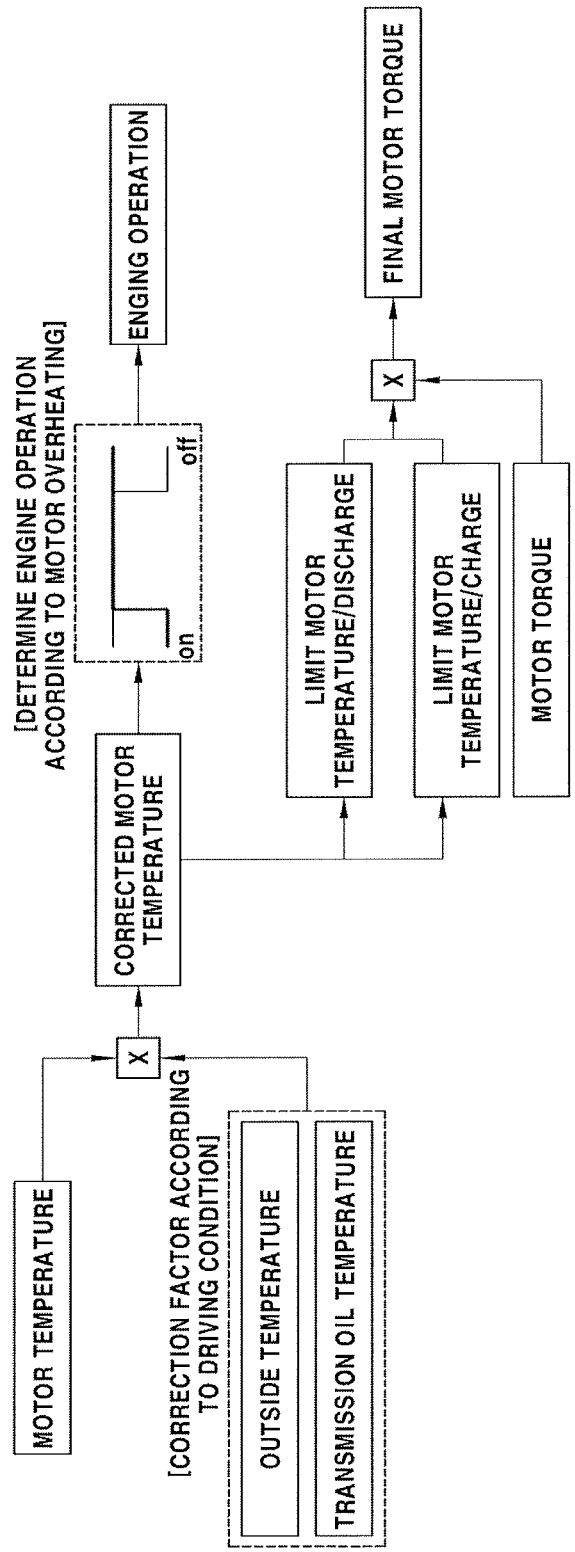
FIG. 2 is an exemplary view illustrating a control process for preventing a motor from overheating when the TMED hybrid vehicle is driven according to an exemplary embodiment of the present invention.
Figure 3:
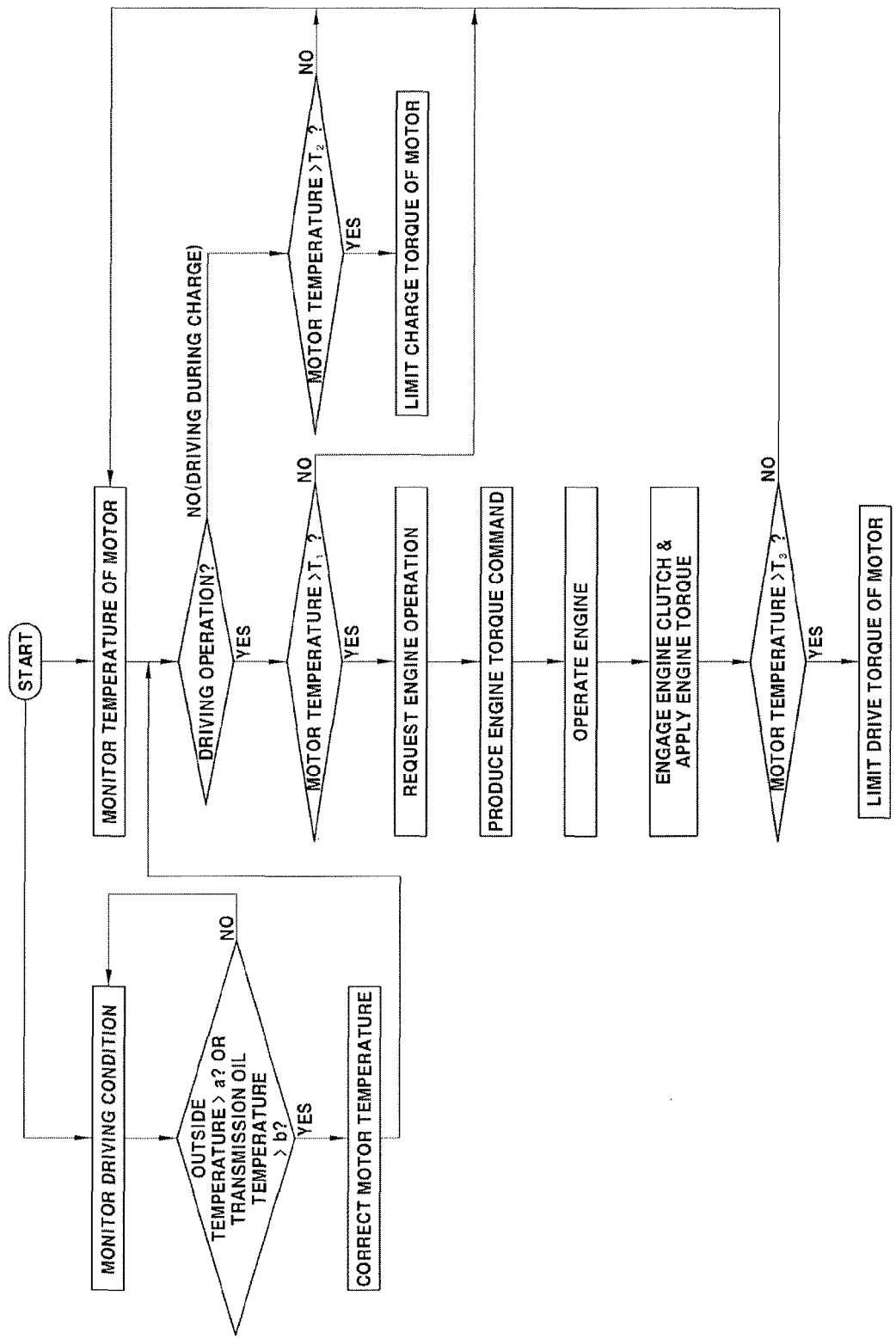
FIG. 3 is an exemplary flowchart illustrating the control process for preventing a motor from overheating when the TMED hybrid vehicle is driven according to an exemplary embodiment of the present invention.

Referring to FIGS. 2 and 3, a current temperature of the motor may be monitored when the TMED hybrid vehicle is driven in the EV mode to prevent a motor from overheating when the TMED hybrid vehicle is driven.

In particular, driving conditions of the vehicle may be monitored simultaneously, and an outside temperature, which affects a motor temperature, and a transmission oil temperature may be monitored. When the outside temperature is greater than a predetermined temperature, or when the transmission oil temperature is greater than a reference temperature, a motor temperature value may be corrected using an outside temperature value and a transmission oil temperature value as temperature correction factors based on the driving condition, and thereafter, whether to operate the engine may be determined based on the corrected motor temperature value (e.g., the current motor temperature).

The transmission oil temperature is a temperature of oil in a transmission installed at a rear side of the motor. In the TMED hybrid vehicle, the transmission is connected to the rear side of the motor connected with the engine by an engine clutch. In other words, the motor is connected between the engine clutch and the transmission. When the vehicle is driven by an operation of the motor, that is, when the vehicle is driven in the EV mode in which the vehicle is driven while the battery is discharged, the current motor temperature may be compared with a first motor temperature T1. Based on a result of the comparison, when the current motor temperature is equal to or greater than the first motor temperature T1, a motor controller may be configured to request an engine controller to operate the engine.

The engine controller, requested by the motor controller to operate the engine, may be configured to produce an engine torque command, operate the engine, and then engage the engine clutch between the motor and the engine, and may also be configured to apply engine torque to the wheel connected with the motor, to allow the vehicle to be driven when motor output is reduced.

When the engine is operated while the vehicle is driven in the EV mode, the motor output may be reduced relative to a torque (e.g., engine torque+motor torque) required by the driver. In particular, when the current motor temperature increases and becomes equal to or greater than a third motor temperature T3, drive torque (e.g., discharge output) of the motor may be limited to a predetermined value or less. In other words, when the current motor temperature is the third motor temperature T3 or greater, output of the motor due to discharge of the battery may be limited to a predetermined value or less, and when the current motor temperature is the third motor temperature T3 or less, the motor temperature may be monitored again.

Particularly, the motor torque may be limited using the current motor temperature, which is the third motor temperature T3 or greater, as a discharge limitation factor (e.g., output limitation factor) based on a driving operation, and the motor torque value limited based on the current motor temperature, may be determined as a final motor torque.

When the vehicle is driven while the battery is being charged, that is, when the vehicle is driven in a regenerative braking mode to charge the battery, the current motor temperature may be compared with a second motor temperature T2. Based on a result of comparison, when the current motor temperature is the second motor temperature T2 or greater, charge torque (e.g., charge output) of the motor may be limited to a predetermined value, and when the current motor temperature is the second motor temperature T2 or less, the motor temperature may be monitored again.

When the current motor temperature is the second motor temperature T2 or greater, charge torque of the motor may be limited using the current motor temperature, which is the second motor temperature T2 or greater, as a charge limitation factor (e.g., output limitation factor) according to regenerative braking, and the motor torque value, limited based on the current motor temperature, may be determined as a final motor torque.

As described above, according to the present invention, when a current motor temperature value (e.g., a value of a motor temperature corrected based on a driving condition) reaches the first motor temperature T1 when the vehicle is driven using output of the motor as a power source (e.g., during the driving operation), the engine may be operated and the motor output may be reduced (e.g., an EV line may be shortened). Further, when the current motor temperature value reaches the third motor temperature T3, the drive torque of the motor (e.g., motor output) may begin to be limited.

When the current motor temperature value reaches the second motor temperature T2 and when the battery is charged using output of the motor by regenerative braking (e.g., when the vehicle is driven while the battery is being charged), charge torque of the motor (e.g., motor output) may begin to be limited. In particular, the first motor temperature T1 may be reached when the engine is operated while the vehicle is driven in the EV mode to thus apply engine torque to the wheel, the second motor temperature T2 may be reached when charge torque of the motor is limited to a predetermined value or less, and the third motor temperature T3 may be reached when discharge torque of the motor is limited to a predetermined value or less.

Particularly, the first motor temperature T1 may be greater than the second motor temperature T2, the second motor temperature T2 may be greater than the third motor temperature T3, and the first motor temperature T1, the second motor temperature T2, and the third motor temperature T3 may be determined in advance by repetitive experiments. The output limitation factor (e.g., current motor temperature) may be distinguished according to the driving condition and the motor output may be limited as described above. In other words, the motor output may be limited based on the current motor temperature that varies based on the driving mode, thereby improving driving performance of the vehicle.

Figure 4:
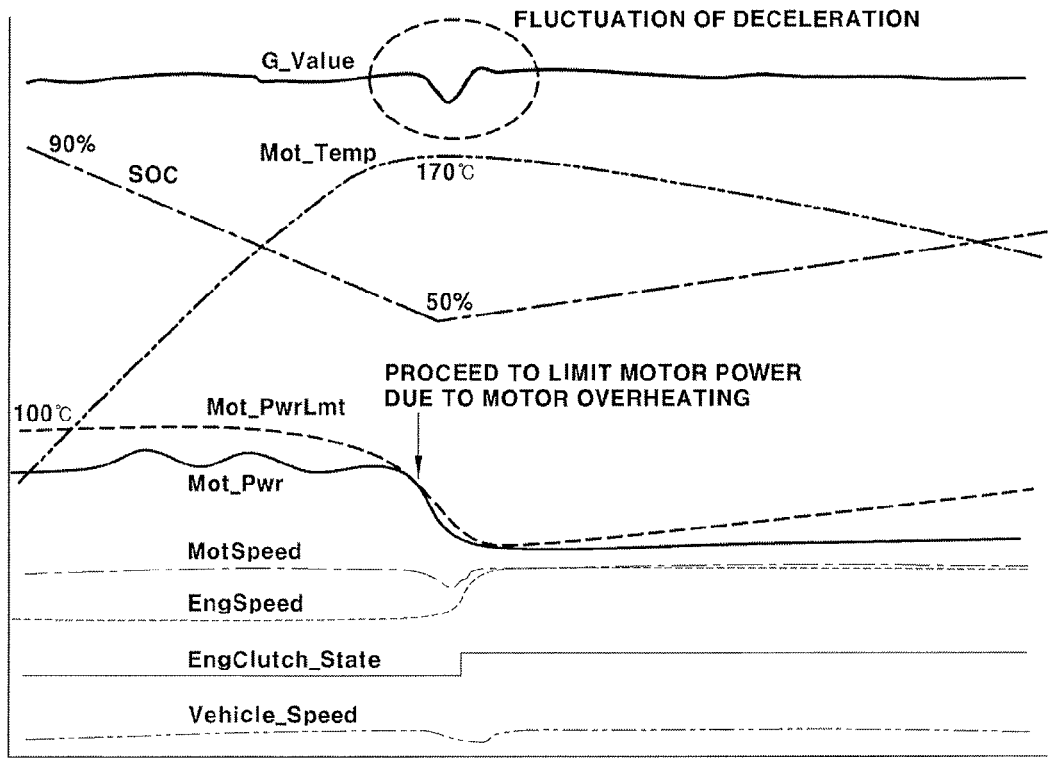
FIG. 4 is an exemplary graph for comparing a point of time at which an engine is operated and a change in motor output according to the control method according to an exemplary embodiment of the present invention with those in the related art.
Figure 4:
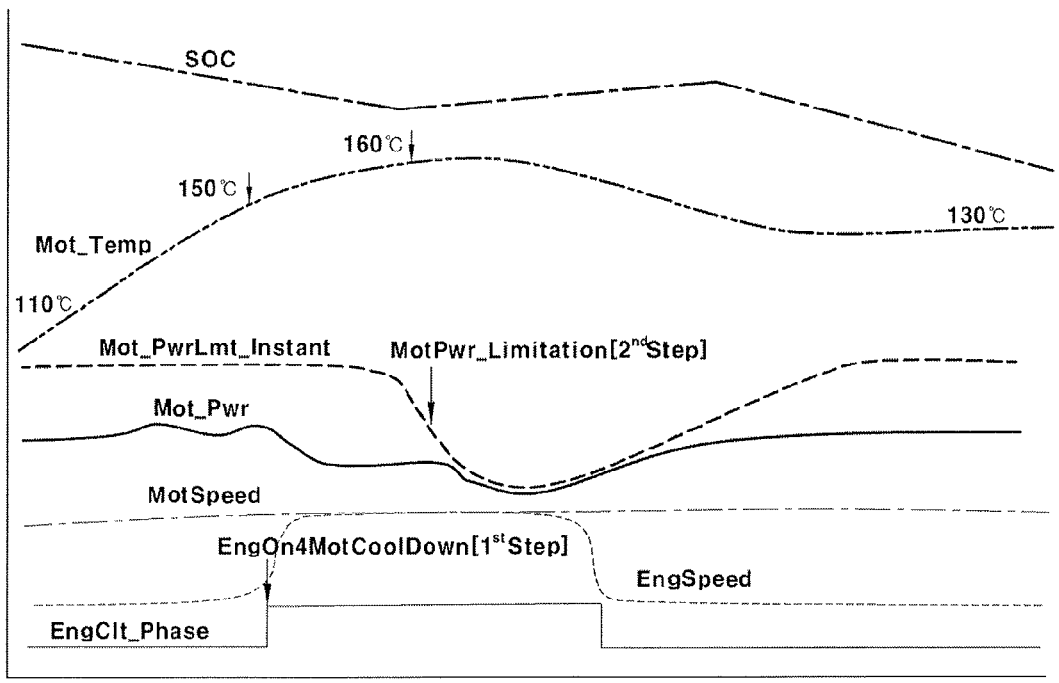

Meanwhile, referring to FIG. 4, since the motor torque in the related art is limited only when the motor is overheated at a predetermined temperature or greater while the vehicle is driven, the engine is suddenly operated due to a rapid increase of an amount of heat emitted from the motor or driving performance deteriorates due to a limitation of output caused by overheating of the motor. In the present invention, the engine may be operated first before the motor output is limited as the motor reaches an overheated state while the vehicle is driven, and thus the motor output may be slowly reduced, thereby preventing a motor from overheating, ensuring a linear braking characteristic, and improving starting and accelerating performance.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A control method for preventing a motor from overheating when a vehicle is driven, comprising:
monitoring, by a controller, a motor temperature of a hybrid vehicle;
operating, by the controller, an engine when the current motor temperature of the motor is a first motor temperature or greater when the vehicle is driven in an electric vehicle mode;
limiting, by the controller, motor output when the current motor temperature is equal to or greater than a third motor temperature, wherein the third motor temperature is greater than the first motor temperature, after the engine is operated, wherein the motor output is limited when the current motor temperature of the motor is a second motor temperature or greater during regenerative braking, and the second motor temperature is greater than the first motor temperature and less than the third motor temperature, and wherein the limiting of the motor output determines a final motor output using the current motor temperature, which has reached the second motor temperature, as an output limitation factor, and limits the motor output to the determined final motor output or less.

2. The control method of claim 1, wherein when an outside temperature of the vehicle is a predetermined temperature or greater or when a transmission oil temperature is a reference temperature or greater, a motor temperature value, corrected using the outside temperature and the transmission oil temperature as temperature correction factors, is used as the current motor temperature.

3. The control method of claim 1, wherein the limiting of the motor output determines a final motor output using the current motor temperature, which has reached the third motor temperature, as an output limitation factor, and limits the motor output to the determined final motor output or less.

4. The control method of claim 1, wherein the vehicle being driven is a transmission mounted electric device hybrid vehicle.

5. A control system for preventing a motor from overheating when a vehicle is driven, comprising:

a memory configured to store program instructions; and a processor configured to execute the program instructions, the program instructions when executed configured to:

monitor a motor temperature of a hybrid vehicle;

operate an engine when the current motor temperature of the motor is a first motor temperature or greater when the vehicle is driven in an electric vehicle mode;

limit motor output when the current motor temperature is equal to or greater than a third motor temperature, wherein the third motor temperature is greater than the first motor temperature, after the engine is operated, wherein the motor output is limited when the current motor temperature of the motor is a second motor temperature or greater during regenerative braking, and the second motor temperature is greater than the first motor temperature and less than the third motor, and wherein the limiting of the motor output determines a final motor output using the current motor temperature, which has reached the second motor temperature, as an output limitation factor, and limits the motor output to the determined final motor output or less.

6. The control system of claim 5, wherein when an outside temperature of the vehicle is a predetermined temperature or greater or when a transmission oil temperature is a reference temperature or greater, a motor temperature value, corrected using the outside temperature and the transmission oil temperature as temperature correction factors, is used as the current motor temperature.

7. The control system of claim 5, wherein the limiting of the motor output determines a final motor output using the current motor temperature, which has reached the third motor temperature, as an output limitation factor, and limits the motor output to the determined final motor output or less.

8. The control system of claim 5, wherein the vehicle being driven is a transmission mounted electric device hybrid vehicle.

* * * * *